US007265508B1

(12) United States Patent
Karasek et al.

(10) Patent No.: US 7,265,508 B1
(45) Date of Patent: Sep. 4, 2007

(54) MOVABLE LIGHT FOR USE WITH A MOVABLE BARRIER OPERATOR

(75) Inventors: Mark Karasek, Lombard, IL (US); Robert Roy Keller, Jr., Park Ridge, IL (US); David Mack, Naperville, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 0 days.

(21) Appl. No.: 11/394,756

(22) Filed: Mar. 31, 2006

(51) Int. Cl.
*H02P 1/00* (2006.01)

(52) U.S. Cl. ...................... 318/280; 318/283; 318/466; 318/468; 049/26; 049/28

(58) Field of Classification Search ................ 318/280, 318/283, 466, 468; 49/26, 28
See application file for complete search history.

(56) References Cited

U.S. PATENT DOCUMENTS 3,287,618 A * 11/1966 Stephens .................... 318/267
4,178,978 A * 12/1979 Burnham .................... 160/321
4,922,168 A * 5/1990 Waggamon et al. ........ 318/286
5,101,082 A 3/1992 Simmons et al.
6,326,751 B1 * 12/2001 Mullet et al. ............... 318/434
6,737,968 B1 5/2004 Ergun et al.
2004/0246721 A1 12/2004 Hoermann

* cited by examiner

*Primary Examiner*—Rina Duda
(74) *Attorney, Agent, or Firm*—Fitch, Even, Tabin & Flannery

(57) ABSTRACT

A barrier movement operator controls the movement of a moveable barrier. The barrier movement operator includes a movable utility light. A head unit is communication with the movable utility light to command the moveable barrier to perform moveable barrier functions. The head unit provides power to the movable utility light in response to performance of the moveable barrier functions and also in response to movement of the movable utility light from a first position disposed at the head unit.

23 Claims, 5 Drawing Sheets

MOVABLE LIGHT FOR USE WITH A MOVABLE BARRIER OPERATOR

TECHNICAL FIELD

This invention relates generally to movable lights, and more particularly to a movable light for use with a movable barrier operator.

BACKGROUND

Various remotely controllable access control mechanisms are known, including movable barrier operators for movable barriers including, but not limited to, single and segmented garage doors, pivoting and sliding doors and cross-arms, rolling shutters, and the like. In general, each such system includes a primary barrier control mechanism. The latter couples in an appropriate way to a corresponding barrier and causes the barrier to move (typically between closed and opened positions).

Movable barrier operators, such as garage door openers, often have lights for illuminating the inside of an enclosure such as a garage. However, these lights often fail to provide sufficient light to certain area of the garage because of their standard fixed locations at the ceiling of the garage. Sometimes it is necessary to illuminate the area underneath, for example, a car to change the car's oil, add air to the car's tires, inspect the car's body, and so forth. Unfortunately, because of their fixed locations at the ceiling of the garage, the lights on the movable barrier operator often fail to completely illuminate the area in which the user needs sufficient light.

Accordingly, in order to acquire the proper illumination, the user typically has to plug in an extension cord coupled to a work light. The extension cord is sometimes plugged into an outlet on the garage door opener or may also be plugged into an outlet on a wall of the garage. The use of such extension cords, however, is cumbersome and may be messy. For example, many extension cords are long and must be manually tied up when not in use. Also, if there is oil or dirt on the garage floor, such oil or dirt may stick to the extension cord and may be tracked into the user's house when the user is, e.g., utilizing the extension cord indoors.

SUMMARY OF THE INVENTION

The present invention is directed to a barrier movement operator for controlling the movement of a moveable barrier. The barrier movement operator includes a movable utility light. A head unit is communication with the movable utility light to command the moveable barrier to perform moveable barrier functions. The head unit provides power to the movable utility light in response to performance of the moveable barrier functions and detachment of the movable utility light from a first position disposed at the head unit.

The present invention is further directed to a movable utility light with a cord retention receptacle integral with a housing of a barrier movement operator. A cord couples the removable utility light to the housing. A sensor senses removal of the movable utility light from the housing, and power is provided to the light in response to (a) removal of the removable utility light from a first position on the housing of the barrier movement operator, and (b) activation of the barrier movement operator to move a moveable barrier.

The present invention is further directed to a method of controlling power to a movable utility light connected to a moveable barrier operator and removably disposed at a first position. The method includes sensing whether the movable utility light is in the first position disposed at the moveable barrier operator. Power to the utility light is controlled in accordance with (a) predetermined barrier movement criteria of the moveable barrier operator, and (b) movement of the utility light from the first position.

The present invention is further directed to a barrier movement operator for controlling the movement of a moveable barrier. A movable utility light has a switch and a user manipulable element to selectively set the switch in an open position and a closed position. An electrical connection link electrically couples a power source to the switch. The movable utility light receives power from the power source in response to the switch being in the closed position. A head unit is in communication with the movable utility light, and functions to command the moveable barrier to perform moveable barrier functions. The head unit provides the power to the movable utility light in response to performance of the moveable barrier functions.

The above summary of the present invention is not intended to represent each embodiment or every aspect of the present invention. The detailed description and Figures will describe many of the embodiments and aspects of the present invention.

BRIEF DESCRIPTION OF THE DRAWINGS

The above needs are at least partially met through provision of the method and apparatus for remote control described in the following detailed description, particularly when studied in conjunction with the drawings, wherein.

Figure 1:
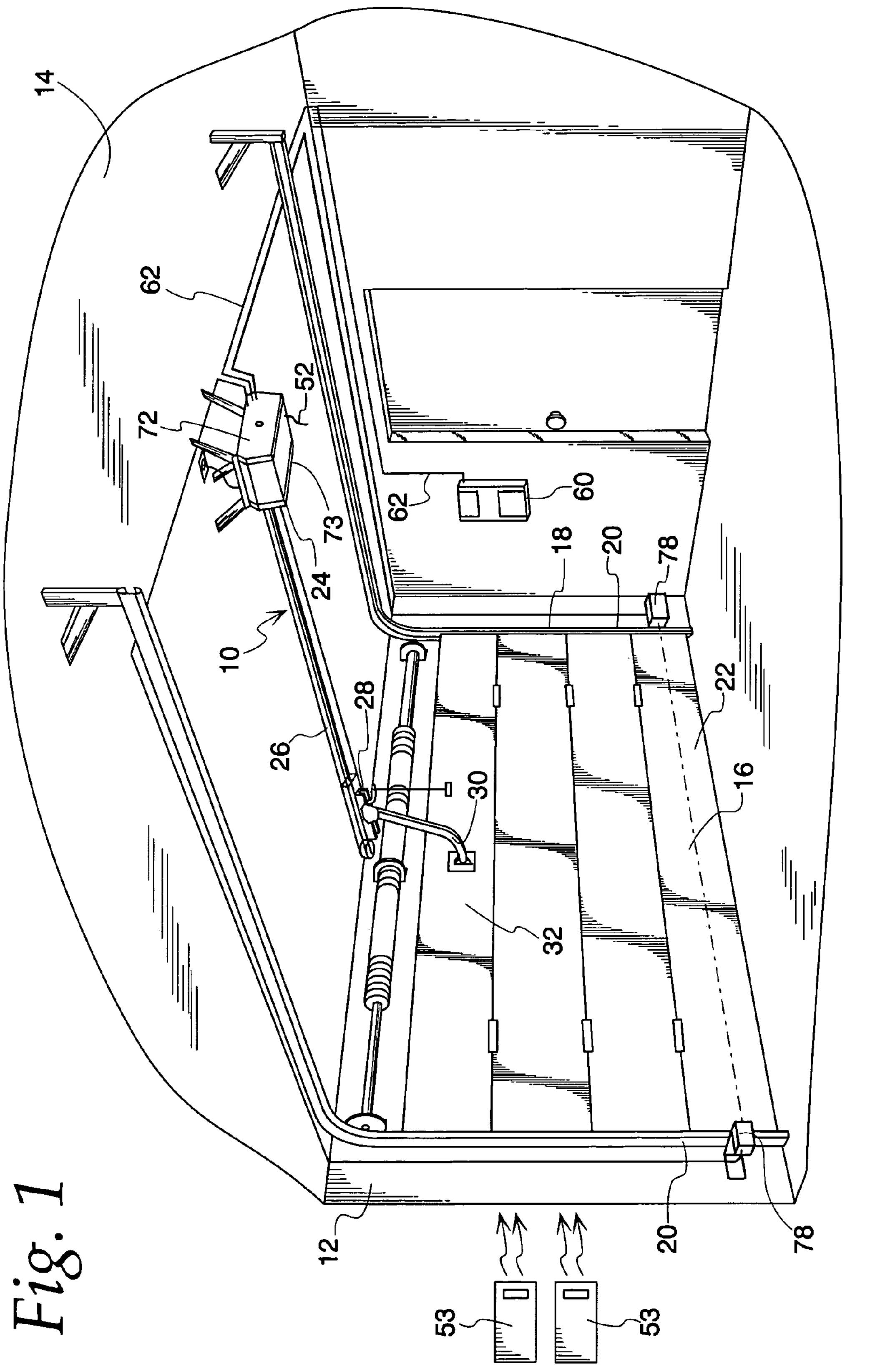
FIG. 1 is a perspective view of a garage including a movable barrier operator, specifically a garage door operator, having associated with it a passive infrared detector in a wall control unit and embodying the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, a movable light, sometimes known as a "trouble light," is provided for use with a moveable barrier operator, such as a garage door opener. The movable light may be engaged with the moveable barrier operator and may function in a manner similar to other lights on the moveable barrier operator during normal operation of the movable barrier operator. The movable light may, however, be manually shifted or physically moved. For example, the movable light may be manually grabbed and pulled down to illuminate an area, e.g., located below the moveable barrier operator.

Power to the movable light may be controlled by, e.g., a controller disposed within the moveable barrier operator or in communication with the moveable barrier operator. As discussed above, when engaged with the movable barrier operator, the movable light functions as any of the lights on the movable barrier operator. While in an initial position engaged with the moveable barrier operator, the movable light may be supplied with power for predetermined durations of time set by a control routine for the moveable barrier operator. For example, a controller of the movable barrier operator may initially be set to provide power to the movable light for 4.5 minutes after the moveable barrier operator has been activated to move a barrier, such as a garage door, to which it is attached. The movable light may also be provided power according to movement of a manual switch that can be actuated by a user. For example, the manual switch may be an on/off switch located on a wall of an enclosure, such as a garage, in which the movable barrier operator is housed. The movable light may also be controlled to be provided power when disengaged from an initial position on the head unit.

The movable barrier operator includes circuitry to detect when the movable light has been decoupled from a housing of the movable barrier operator. For example, when the user disengages the movable light from an initial position on the movable barrier operator such as, e.g., by pulling the movable light down from the housing, the movable light may be supplied with power. In the event that the movable light was already supplied with power when the user disengaged the movable light from its initial position, it will remain powered. Alternatively, in the event that the movable light was not powered when the user disengaged the movable light from its initial position, the movable light will be provided with power once movement of the movable light from the movable barrier operator housing is detected. Accordingly, by disengaged the movable light from its initial position on the movable barrier operator, the movable light may be powered to illuminate an area so desired by the user.

Referring now to drawings and especially to FIG. 1, a movable barrier operator embodying the present invention is shown therein and generally identified by reference numeral 10. The movable barrier operator, in this embodiment a garage door operator 10, is positioned within a garage 12. More specifically, it is mounted to a ceiling 14 of the garage 12 for operation, in this embodiment, of a multipanel garage door 16. The multipanel garage door 16 includes a plurality of rollers 18 rotatably confined within a pair of tracks 20 positioned adjacent to and on opposite sides of an opening 22 for the garage door 16.

The garage door operator 10 also includes a head unit 24 for providing motion to the garage door 16 via a rail assembly 26. The rail assembly 26 includes a trolley 28 for releasable connection of the head unit 24 to the garage door 16 via an arm 30. The arm 30 is connected to an upper portion 32 of the garage door 16 for opening and closing it. The trolley 28 is connected to an endless chain to be driven thereby. The chain is driven by a sprocket in the head unit 24. The sprocket acts as a power takeoff for an electric motor located in the head unit 24.

Figure 2:
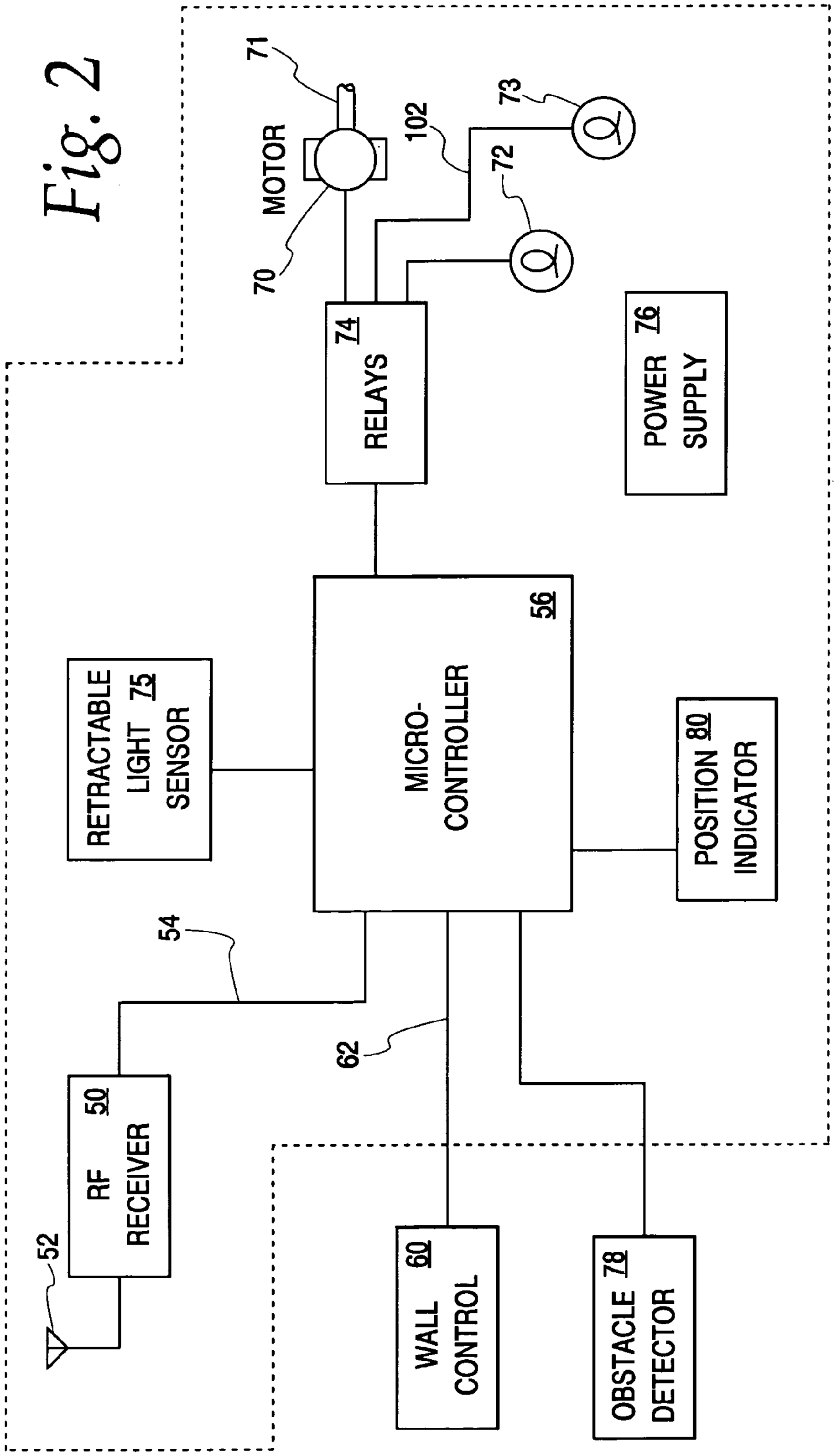
FIG. 2 is a block diagram showing the relationship between major electrical systems of a portion of the garage door operator shown in FIG. 1.

The head unit 24 includes a radio frequency receiver 50, as may best be seen in FIG. 2, having an antenna 52 associated with it for receiving coded radio frequency transmissions from one or more radio transmitters 53 which may include portable or keyfob transmitters or keypad transmitters. The radio receiver 50 is connected via a line 54 to a microcontroller 56 which interprets signals from the radio receiver 50 as code commands to control other portions of the garage door operator 10.

A wall control unit 60 communicates over a line 62 with the head unit microcontroller 56 to effect control of a garage door operator motor 70, a stationary light 72, and a movable light 73 via relay logic 74 connected to the microcontroller 56. The relay logic 74 is in electrical communication with the movable light 73 via extension cord 102. The entire head unit 24 is powered from a power supply 76. In addition, the garage door operator 10 includes an obstacle detector 78 which optically or via an infrared pulsed beam detects when the garage door opening 22 is blocked and signals the microcontroller 56 of the blockage. The microcontroller 56 then causes a reversal or opening of the door 16. In addition, a position indicator 80 indicates to the head unit microcontroller 56, through at least part of the travel of the door 16, the door position so that the microcontroller 56 can control the close position and the open position of the door 16 accurately. A movable light sensor 75 detects when the movable light 73 is engaged with the head unit 24, and the microcontroller 56 provides power to the movable light 73 when it is determined, based on an output from the movable light sensor 75, that the movable light 73 has been moved from an initial position on the head unit 24, as discussed below with respect to FIGS. 3-6.

Figure 3:
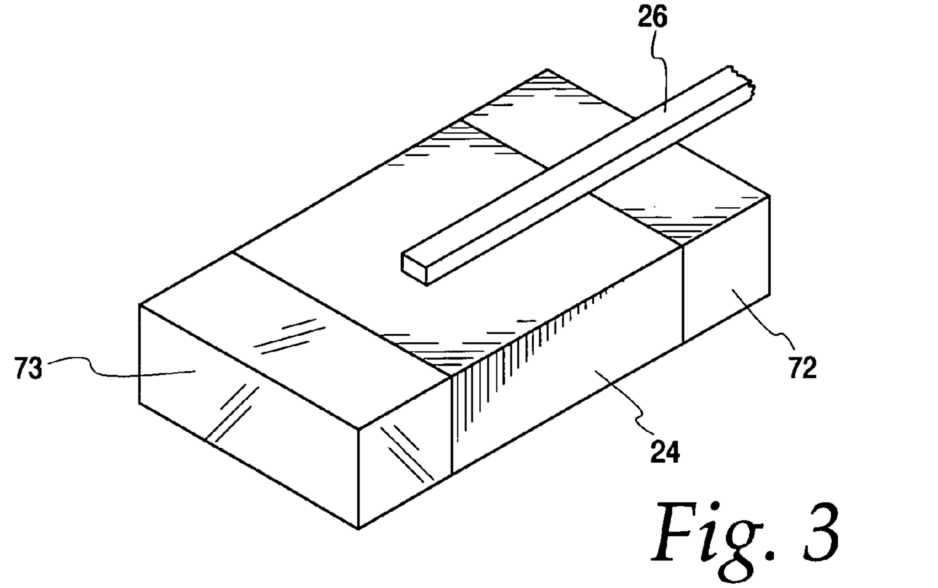
FIG. 3 illustrates a perspective view of a head unit having a movable light and a stationary light according to an embodiment of the invention.

FIG. 3 illustrates a perspective view of a head unit 24 having a movable light 73 and a stationary light 72 according to an embodiment of the invention. The movable light 73 and the stationary light 72 may each utilize, e.g., incandescent light bulb(s), such as a 60 watt incandescent light bulb, or fluorescent light bulb(s) to illuminate the interior of a housing in which the garage door operator 10 is located.

As shown, the movable light 73 may appear very similar to the stationary light 72. However, the stationary light 72 is fixedly mounted onto the head unit 24 and is not removable without physically taking apart the head unit 24. The movable light 73, on the other hand, while also being engaged with the head unit 24, is movable from an initial position on the head unit 24. For example, a user may physically disengage the movable light 73 from the head unit 24 and then move the movable light 73 to illuminate various areas within the garage 12. In an alternative embodiment, the movable light may remain engaged with the head unit but may be moved relative to its initial position. For example, the movable light 73 may be slightly rotated in a clockwise direction to better illuminate an area in a clockwise direction relative to the movable light. In some embodiments, the movable light 73 may include a handle or grip (not shown), to allow the user to safely grip the movable in the event that the movable light 73 is hot such as, e.g., when the movable light 73 utilizes incandescent light bulb(s). The movable light 73 may, e.g., be attached to the head unit 24 with a magnet or a hook.

The head unit 24 may include a detector such as a sensor or switch to detect when the movable light 73 is engaged with the head unit 24. For example, the detector may include a depressible switch that is in one position when the movable light 73 is engaged with the head unit 24, and in another position when the movable light 73 is not engaged with the head unit 24. Based on the position of the switch, the movable light 73 may be selectively powered.

Figure 4:
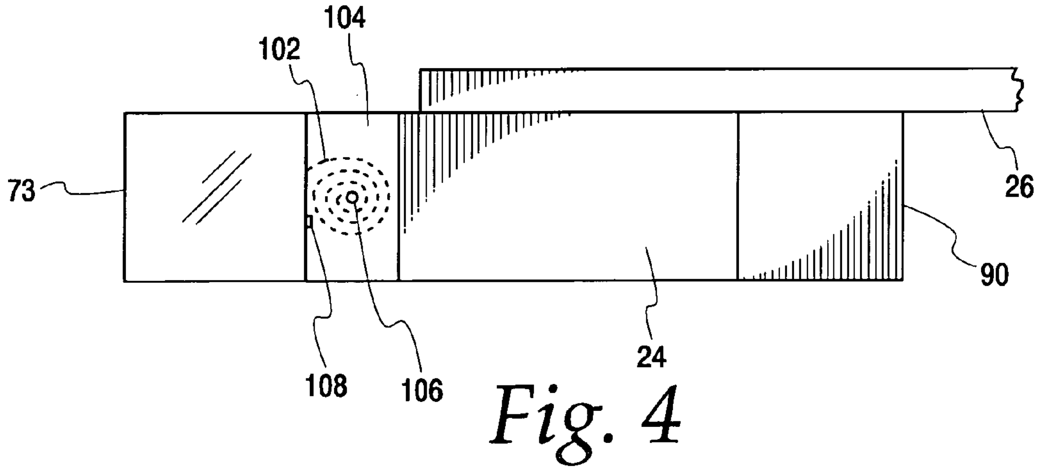
FIG. 4 illustrates a side view of a head unit having a movable light according to an embodiment of the invention.

FIG. 4 illustrates a side view of a head unit 24 having a movable light 73 according to an embodiment of the invention. As shown, the movable light 73 is engaged with an end of the head unit 24. The movable light 73 may be engaged with the end of the head unit 24 facing the garage door 16. Alternatively, the movable light 73 may be engaged with the end of the head unit 24 opposing the garage door 16 or at an angle to the garage door 16. In additional embodiments, the movable light 73 and the stationary light 72 may be located on the sides of the head unit 24, instead of engaged to the front and the back of the head unit 24, as shown in FIG. 4. In other embodiments, the movable light 73 may be engaged with the bottom of the head unit 24, i.e., the side of the head unit 24 facing the floor of the garage 12 in which the garage door operator 10 is mounted.

As illustrated, the movable light 73 is electrically coupled to the head unit 24 by an extension cord 102. The extension cord 102 may be wound up into a storage compartment 104 of the head unit. The storage compartment 104 may include, e.g., a wind-up reel 106 around which the extension cord is wrapped when inside of the storage compartment 104. Alternatively, the storage compartment 104 may include any other element suitable for assisting in the storage of the extension cord 102.

As discussed above, the head unit 24 may also include a movable switch 108 to detect when the movable light 73 is engaged with the head unit 24. For example, when the movable light 73 is engaged with the head unit 24, it is determined that light need only be provided by the movable light 73 when the garage door operator 10 has been activated to, e.g., open the garage door 12. However, when the movable light 73 is not engaged with its initial position on the head unit 24, it is determined that the user has detached the movable light 73 from the head unit 24 and is currently using the movable light 73 to illuminate an area of the garage 12. Accordingly, when the movable light 73 is moved from its initial position on the head unit 24, the movable switch 108 signals indicates such occurrence, and the movable light 73 is provided with power. Accordingly, the switch 108 may be utilized in a manner similar to a switch hook on a telephone in that it provides power to the movable light when the movable light 73 is disengaged from the head unit 24.

Figure 5:
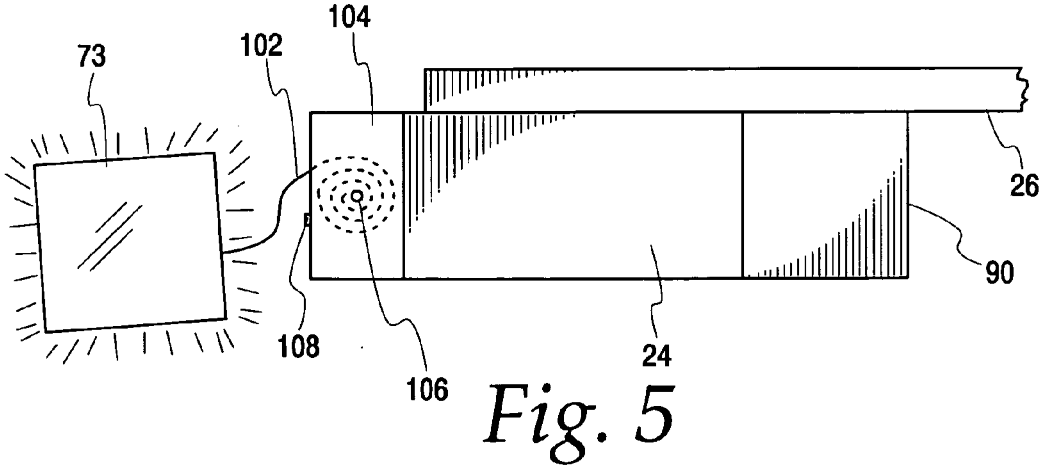
FIG. 5 illustrates the movable light when disengaged from the head unit according to an embodiment of the invention.

FIG. 5 illustrates the movable light 73 when disengaged from the head unit 24. As shown, the movable light 73 may be pulled away from the head unit 24. As the movable light 73 is pulled away, the extension cord 102 unwinds from the windup reel 106, extending out of the storage compartment 104. The switch 108 also extends outwardly from the storage compartment 104 because the movable light 73 is not pushing it into the storage compartment 104 as it does when the movable light 73 is engaged with the head unit 24. In alternative embodiments, as discussed above, the movable light 73 may remain engaged with the head unit 73 but may be moved relative to its initial position. For example, the movable light 73 may be slightly rotated in a clockwise direction to better illuminate an area in a clockwise direction relative to the movable light. When moved from its initial position, the movable light 73 may be provided with power.

Figure 6:
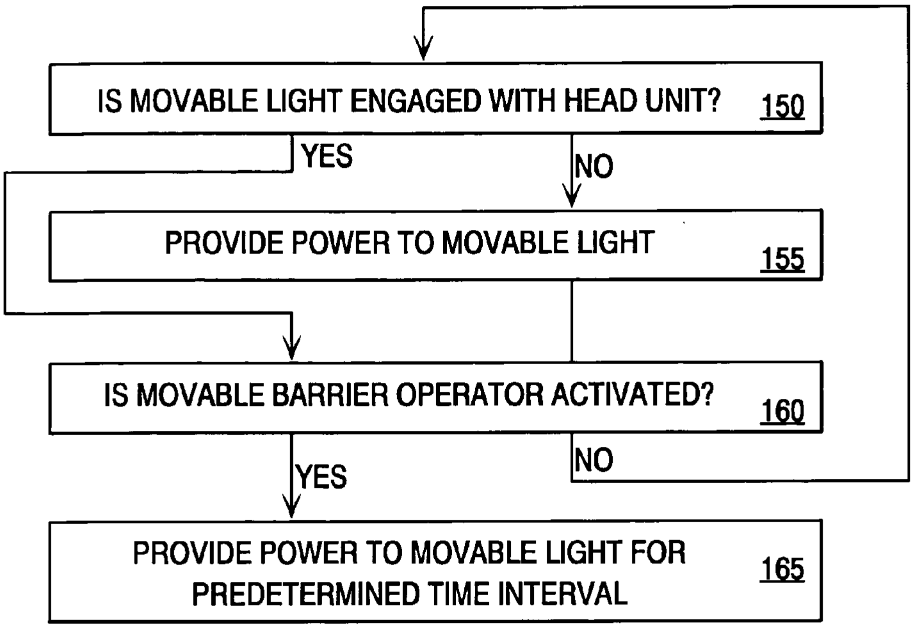
FIG. 6 illustrates a method of providing power to the movable light according to an embodiment of the invention.

FIG. 6 illustrates a method of providing power to the movable light 73 according to an embodiment of the invention. First, at operation 150 the microcontroller 56 determines whether the movable light 73 is engaged with the head unit 24 in an initial position on the head unit 24. If it is not, electrical power is provided to the movable light 73 at operation 155, and then processing returns to operation 150. If the movable light 73 is, however, engaged with the head unit 24, a determination of whether the garage door operator 10 has been activated is made at operation 160. For example, the garage door operator 10 may be activated when the user pushes a button to cause the garage door operator 10 to open the garage door 12. If the garage door operator 10 has not been activated, processing returns to operation 150. In the event that the garage door operator 10 has been activated, electrical power is provided to the movable light 73 at operation 165 for a predetermined time interval.

Figure 7:
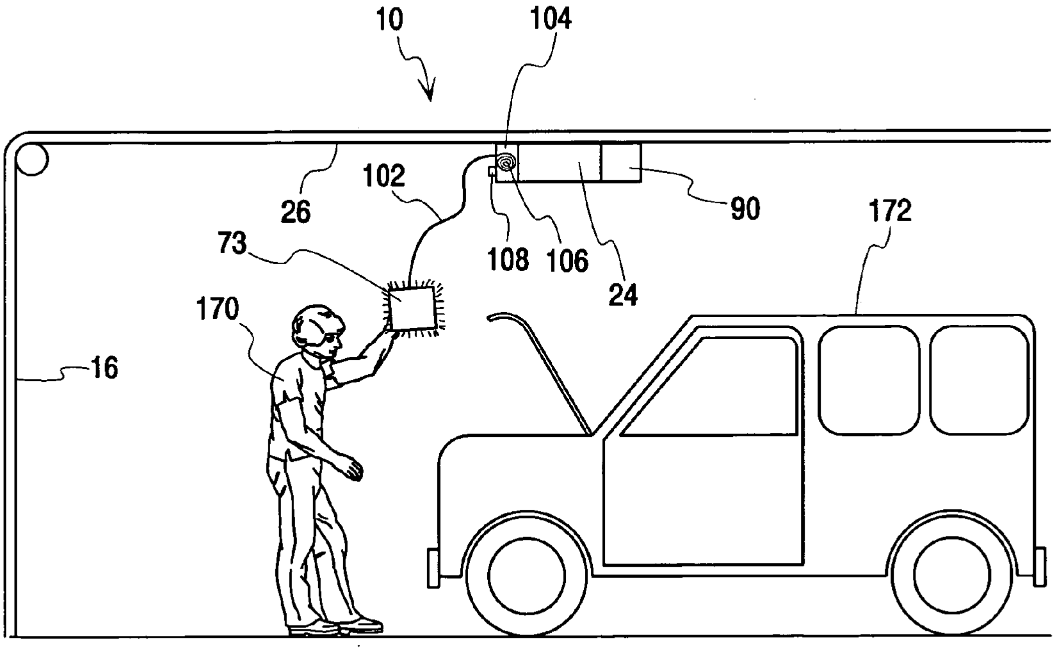
FIG. 7 illustrates the movable light being utilized according to an embodiment of the invention.

FIG. 7 illustrates the movable light 73 being utilized according to an embodiment of the invention. As shown, a user 170 has disengaged the movable light 73 from the head unit 24. Being disengaged, the movable light 73 is electrically powered by the head unit 24 so that the user 170 can illuminate the area around the user's automobile 172, for example.

Figure 8:
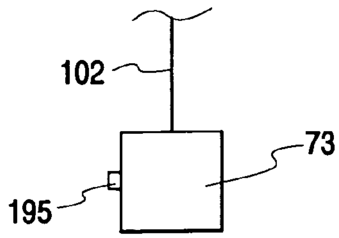
FIG. 8 illustrates a switch on the movable light according to an embodiment of the invention.

FIG. 8 illustrates a switch 195 on the movable light 73 according to an embodiment of the invention. The switch 195 may be utilized by the user 170 to selectively illuminate the movable light 73. According, whereas the head unit 24 provides power to movable light 72, the user 170 may control the illumination of the movable light 73.

Figure 9:
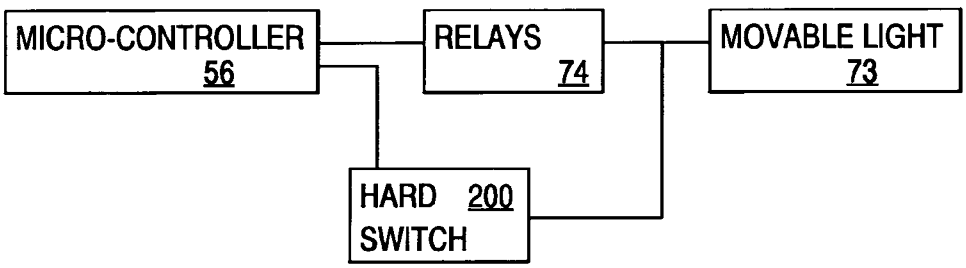
FIG. 9 illustrates a hard switch for providing power to the movable light according to an embodiment of the invention.

FIG. 9 illustrates a hard switch 200 for providing power to the movable light 73 according to an embodiment of the invention. The hard switch 200 may be utilized to provide power to the movable light 73 regardless of the operation of movable barrier operator or any input from the microcontroller 56. For example, even if the moveable barrier operator is not in use, the user may selectively turn on the hard switch 200 to provide power to the movable light 73. The hard switch 200 may, e.g., comprise a manual switch located on the wall of the enclosure.

Figure 10:
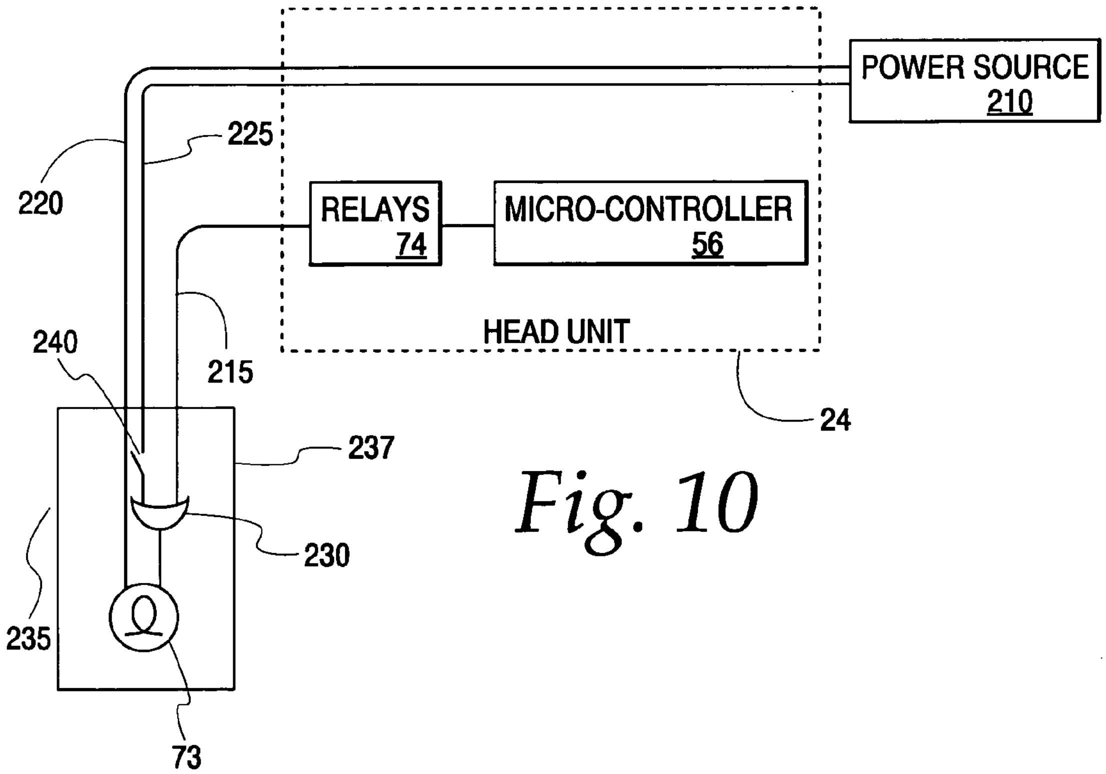
FIG. 10 illustrates the electrical connections between the movable light and the head unit according to an embodiment of the invention.

FIG. 10 illustrates the electrical connections between the movable light 73 and the head unit 24 according to an embodiment of the invention. As shown, a power source 210 supplies electrical power to the micro-controller 56. The power source 210 may comprise, e.g., an electrical outlet. The microcontroller 56 is in communication with the relays 74, and upon operation of the movable barrier operator 10, the micro-controller 56 supplies electrical power to the movable light 73 via the relays 74. The electrical power may be supplied to the movable light via a first wire 215. The movable light 73 is also in communication with the power source 210 via a second wire 220 and a third wire 225. The second wire 220 may provide a reference voltage to the movable light 73 such as a ground reference or neutral reference. The third wire 225 is also in electrical connection with the power source 210. The third wire 210 may be a "hot" wire that is always supplied with electrical power by the power source 210.

According to the embodiment illustrated in FIG. 10, the user may depress a button 235 on the movable light 73 that is in communication with a switch 240 within a housing 237 of the movable light 73. By depressing the button 235, the user may toggle the switch 240 between open and closed positions. The switch 240 and the first wire 215 may both be coupled to an OR gate 245 within the housing 237. The OR gate 230 is utilized to provide an output to power the movable light 73. As illustrated, when the switch 240 is in a closed position, electrical power from the power source 210 reaches the OR gate 230 via the third wire 225. If, however, the switch 240 is in an open position, electrical power from the power source will not reach the OR gate 230 via the third wire 225.

The OR gate 230 functions such that a signal to power the movable light 73 is output whenever the switch 240 is in the closed position due to the fact that the third wire 225 is in direct communication with the power source 210. An output to power the movable light 73 is also generated whenever the microcontroller 56 and relays 74 output an electrical signal via the first wire 215 such as, e.g., when the movable barrier operator 10 functions to move the movable barrier. The embodiment illustrated in FIG. 10 therefore powers the movable light 73 according both to the user's control and control of the micro-controller 56 according to the movable barrier operator functions.

Although the embodiment illustrated in FIG. 10 includes an OR gate 230, it should be appreciated that an OR gate may not be required other embodiments. Also, although not shown, the first wire 215, the second wire 220, and the third wire 225 may all be contained within the extension cord 102 discussed above with respect to, e.g., FIG. 2.

According to an alternative embodiment of the invention, the movable light 73 may comprise a flood light or spot light that may be powered according to normal operation of the movable barrier operator. However, instead of turning off after, e.g., 4.5 minutes like the station light 72 would under normal operation, the movable light 73 may instead be powered for a longer period of time such as, e.g., 9 minutes. Alternatively, the amount of time for which the movable light is to be powered may be programmed by the user. In additional embodiments, the moveable light remains powered until the user manually turns off the light such as, e.g., through use of a switch.

Although the head unit 24 is shown as having both a permanently fixed light 72 and a movable light 73, it should be appreciated that in some embodiments, only the movable light 73 is utilized and a permanently fixed light 72 is omitted. Also, although the switch 108 is shown as being mounted on the head unit 24, in other embodiments, the switch 108 may instead be mounted on the movable light 73 itself. Also, a switch 108 need not be utilized to detect whether the movable light 73 is currently engaged with the head unit 24. Instead, a sensor may be utilized to detect the presence of the movable light 73. The sensor may be a magnetic sensor or an optical sensor, for example.

In other embodiments, there is no permanently fixed light 72 but instead there are two or more movable lights 73 on the head unit 24, which may or may not be disengaged simultaneously to provide greater illumination control to the user 170. In additional embodiments, no extension cord 102 is used. Instead, the movable light 73 has a rechargeable battery that charges when the movable light 73 is engaged with the head unit 24 and powers the movable light 73 to emit light when the garage door operator 10 is in use or when the movable light 73 has been manually disengaged from the head unit 24.

In additional embodiments, the movable light 73 may be engaged with the head unit 24 via a magnetic connection, Velcro™, a frictional fit, a taped interference, a spring tab, a ball and socket, a snap tab, or in any other suitable manner. The movable light 73 may also include a courtesy outlet to allow other electric devices to receive power in some embodiments. In the event that the movable light 73 is disengaged from its initial position on the head unit, the movable barrier operator is disabled in other embodiments. In such embodiments, the movable light 73 may indicate that someone wishes to operate the movable barrier operator by, e.g., the microcontroller 56 causing a slight interruption in the supply of power to the movable light causing the illumination of the movable light 73 to flicker.

Accordingly, pursuant to the various embodiments discussed above, a movable light 73 is provided for use with a moveable barrier operator, such as a garage door opener. The movable light 73 may be engaged in an initial position on the head unit 24 of the moveable barrier operator and, when engaged with the head unit 24, may function as any other light attached to the movable barrier operator. The movable light 73 may be manually grabbed by a user 170 and pulled down to illuminate an area, e.g., located below the moveable barrier operator. Power to the movable light 73 may be controlled by, e.g., a microcontroller 56 disposed within the moveable barrier operator or in communication with the moveable barrier operator. While in an initial position engaged with the head unit 24, the movable light 73 may be supplied with power for predetermined durations of time set by a control routine for the moveable barrier operator. The movable light 73 may also be controlled to light up according to movement of a manual switch that can be actuated by the user 170.

The movable barrier operator includes a detector, sensor, or other circuitry to detect when the movable light 73 has been decoupled from the head unit 24 of the movable barrier operator. For example, when the user 170 pulls the movable light 73 down from the head unit 24, the movable light 73 may be supplied with power. In the event that the movable light 73 was already supplied with power when the user 170 pulls down the movable light 73, it will remain powered. Alternatively, in the event that the movable light 73 was not powered when the user 170 began pulling down the movable light 73, the movable light 73 will be provided with power once movement of the movable light 73 from the head unit 24 is detected. Accordingly, by pulling down the movable light 73 from the head unit 24, the movable light 73 may be powered to illuminate an area so desired by the user 170.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A barrier movement operator for controlling the movement of a moveable barrier, comprising:
- a movable utility light;
- a head unit for commanding the moveable barrier to perform moveable barrier functions; and
- a controller for controlling the head unit to provide power to the movable utility light in response to performance of the moveable barrier functions and in response to the movement of the movable utility light from a first position disposed at the head unit to a second position disposed away from the head unit.

2. The barrier movement operator of claim 1, wherein the moveable barrier functions include controlling movement of the moveable barrier.

3. The barrier movement operator of claim 1, wherein the head unit is in electrical communication with the movable utility light via a cord.

4. The barrier movement operator of claim 3, further comprising a cord retention receptacle to house the cord.

5. The barrier movement operator of claim 4, wherein the cord retention receptacle comprises a cord reel.

6. The barrier movement operator of claim 1, wherein the head unit includes a sensor to sense whether the movable utility light is in the first position disposed at the head unit.

7. The barrier movement operator of claim 1, wherein the movable utility light includes a rechargeable battery, the rechargeable battery receiving power when the movable utility light is in the first position disposed at the head unit.

8. The barrier movement operator of claim 1, further comprising a switch in communication with the head unit and the movable utility light, wherein in response to the switch being in a first position, power is provided to the movable utility light.

9. A movable utility light with a cord retention receptacle integral with a housing of a barrier movement operator, comprising:

a cord to electrically couple the movable utility light to the housing; and wherein a sensor senses removal of the movable utility light from the housing; and a controller to provide power to the movable utility light in response to movement of the movable utility light from a first position on the housing of the barrier movement operator to a second position disposed away from the housing, and activation of the barrier movement operator to move a moveable barrier.

10. The movable utility light of claim 9, wherein the sensor is disposed within the housing of the barrier movement operator.

11. The movable utility light of claim 9, wherein the movable utility light includes a rechargeable battery, the rechargeable battery receiving power when the movable utility light is in the first position disposed at barrier movement operator.

12. The movable utility light of claim 9, wherein the sensor is a mechanical switch.

13. The movable utility light of claim 9, wherein the sensor is a magnetic sensor.

14. The movable utility light of claim 9, wherein the sensor is an optical sensor.

15. The movable utility light of claim 9, wherein the cord retention receptacle comprises a cord reel.

16. A method of controlling power to a movable utility light connected to a moveable barrier operator and removably disposed at a first position, the method comprising:

sensing whether the movable utility light is in the first position disposed at the moveable barrier operator; and controlling power provided to the movable utility light in accordance with predetermined barrier movement criteria of the moveable barrier operator, and movement of the movable utility light from the first position to a second position disposed away from the movable barrier operator.

17. The method of claim 16, wherein the predetermined barrier movement criteria include a detection of an activation of the barrier movement operator to move a moveable barrier.

18. The method of claim 16, wherein the sensing includes determining a state of a mechanical switch.

19. The method of claim 16, wherein the sensing includes magnetically sensing wherein the movable utility light is disposed in the first position.

20. The method of claim 16, wherein the sensing includes optically sensing whether the movable utility light is disposed in the first position.

21. A barrier movement operator for controlling the movement of a moveable barrier, comprising:

a movable utility light having a switch and a user manipulable element to selectively set the switch in an open position and a closed position;

an electrical connection link to electrically couple a power source to the switch, wherein the movable utility light receives power from the power source in response to the switch being in the closed position; and a head unit in communication with the movable utility light to command the moveable barrier to perform moveable barrier functions, wherein the head unit provides the power to the movable utility light in response to performance of the moveable barrier functions and in response to the movement of the movable utility light from a first position disposed at the head unit to a second position disposed away from the head unit.

22. The barrier movement operator of claim 21, wherein the electrical connection link is an electrically conductive wire.

23. The barrier movement operator of claim 21, wherein the user manipulable element is a switch.

* * * * *